United States Patent [19]
De Haan

[11] Patent Number: 4,873,575
[45] Date of Patent: Oct. 10, 1989

[54] CIRCUIT ARRANGEMENT FOR ENHANCING THE HORIZONTAL DEFINITION OF A TELEVISION SIGNAL

[75] Inventor: Gerard De Haan, Eindhoven, Netherlands

[73] Assignee: U. S. Philips Corporation, New York, N.Y.

[21] Appl. No.: 312,320

[22] Filed: Feb. 16, 1989

Related U.S. Application Data
[63] Continuation of Ser. No. 145,858, Jan. 20, 1988, abandoned.

[30] Foreign Application Priority Data
Jan. 23, 1987 [NL] Netherlands ............... 8700162

[51] Int. Cl.⁴ .............................. H04N 5/14
[52] U.S. Cl. .................... 358/166; 358/167; 358/105
[58] Field of Search ............ 358/167, 166, 37, 36, 358/105, 160

[56] References Cited

U.S. PATENT DOCUMENTS

| | | | |
|---|---|---|---|
| 4,217,608 | 8/1980 | MacGregor et al. | 358/166 X |
| 4,242,705 | 12/1980 | Ebihara | 358/167 |
| 4,334,237 | 6/1982 | Reitmeier et al. | 358/167 X |
| 4,546,386 | 10/1985 | Matsumoto et al. | 358/105 X |
| 4,636,862 | 1/1987 | Hatori et al. | 358/166 |
| 4,740,842 | 4/1988 | Annegarn et al. | 358/105 X |

OTHER PUBLICATIONS
Arragon et al., "Transmission d'Images de Télévision à Haute définition", 27 Acta Electronica, 5-1985 pp. 20-32.

*Primary Examiner*—James J. Groody
*Assistant Examiner*—Mark R. Powell
*Attorney, Agent, or Firm*—Michael E. Marion

[57] ABSTRACT

The horizontal definition of an interlaced television signal sampled in anti-phase from picture to picture can be enhanced by using a selection circuit with which a signal sample located horizontally between two successive signal samples from the current field is obtained from three horizontally successive signal samples of two successive pictures, which signal sample can be added between these signal samples from the current field.

7 Claims, 1 Drawing Sheet

CIRCUIT ARRANGEMENT FOR ENHANCING THE HORIZONTAL DEFINITION OF A TELEVISION SIGNAL

This is a continuation of application Ser. No. 145,858, filed Jan. 20, 1988 now abandoned.

BACKGROUND OF THE INVENTION

The invention relates to a circuit arrangement for enhancing the horizontal definition of an interlaced television signal sampled in anti-phase from picture to picture, in which television signals corresponding to television signal samples of each of two successive pictures, are combined in a motion-dependent manner.

A circuit arrangement of the type described is known from Acta Electronica, 27, 1-2, 1985, page 26 in which for the purpose of enhancing the horizontal definition the signal samples of pixels from the previous picture located horizontally between the pixels corresponding to the signal samples of the incoming television signal are used for stationary pictures. A motion detector is used for this purpose.

SUMMARY OF THE INVENTION

It is an object of the invention to achieve substantially the same result without using a motion detector.

According to the invention a circuit arrangement of the type described in the opening paragraph is therefore characterized in that the circuit arrangement comprises a selection circuit to which three television signals are applied which correspond to each of three horizontally successive samples of the same vertical position from each of two successive pictures, an output signal being obtained at an output of said selection circuit which at any instant is the television signal applied to one of its three inputs whose amplitude at that instant is closest to the mean value of the amplitudes of the television signals applied to said three inputs.

Due to this measure it is possible to achieve substantially the same result without using a motion detector as with the known circuit in a circuit having only two field delay circuits which jointly constitute a picture delay circuit.

BRIEF DESCRIPTION OF THE DRAWINGS

The invention will now be described in greater detail with reference to the accompanying drawing in which.

DETAILED DESCRIPTION OF THE INVENTION

Figure 1:
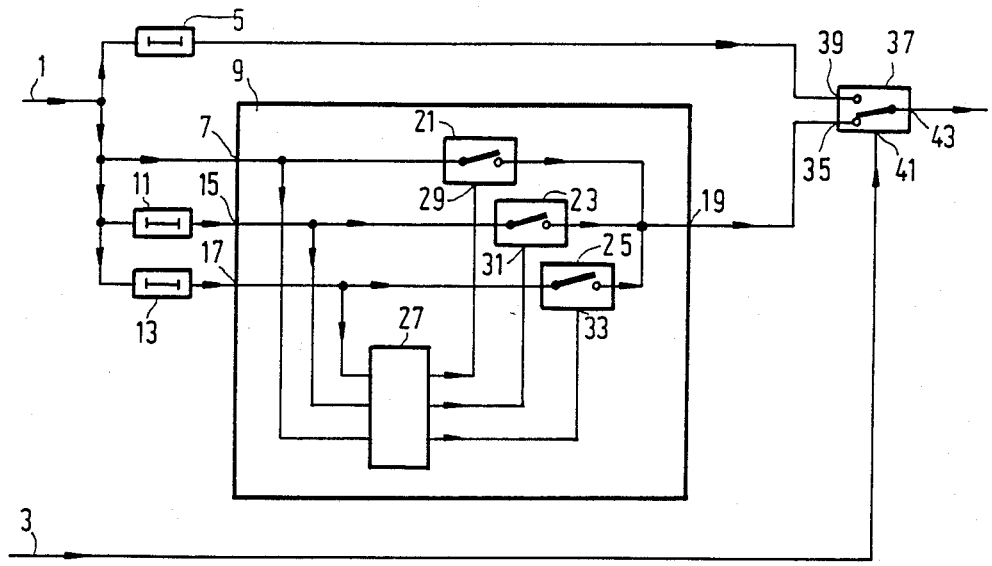
FIG. 1 is a block diagram of a possible embodiment of a circuit arrangement according to the invention and FIG. 2 is also a block diagram of a further possible embodiment of a circuit arrangement according to the invention.

In FIG. 1 an interlaced television signal whose horizontal definition must be enhanced and which is sampled in anti-phase from picture to picture is applied to an input 1 of the circuit arrangement.

A clock signal having the sampling frequency of the television signal applied to the input 1 is applied to an input 3 of the circuit arrangement.

The input 1 is connected to an input of a delay circuit 5 having a delay of half a period of the clock signal of the sampling frequency, to an input 7 of a selection circuit 9, to an input of a picture delay circuit 11 having a delay of one picture period plus half a period of the clock signal of the sampling frequency and to an input of a delay circuit 13 having a delay of one period of the clock signal of the sampling frequency.

The output of the picture delay circuit 11 is connected to an input 15 of the selection circuit 9 a further input 17 of which is connected to the output of the delay circuit 13.

An output 19 of the selection circuit 9 receives the television signal applied to the input 7, 15 or 17 via a switch 21, 23 or 25 from the relevant input 7, 15 or 17. The inputs of a decision circuit 27 are connected to the inputs 7, 15, 17 of the selection circuit 9 and the outputs are connected to operating signal inputs 29, 31, 33 of the switches 21, 23, 25, respectively.

Under the influence of the decision circuit 27 that switch of the switches 21, 23, 25 is closed at whose input the television signal occurs whose amplitude is closest to the mean value of the amplitudes of the three television signals applied to the inputs 7, 15, 17 of the selection circuit 9. This television signal is then applied to the output 19 of the selection circuit 9 and is supplied via this output 19 to an input 35 of a change-over switch 37 a further input 39 of which is connected to the output of the delay circuit 5.

An operating signal input 41 of the change-over switch 37 receives the clock signal having the sampling frequency from the input 3. During one half of a clock signal period the input 35 of the change-over switch 37 is therefore connected to an output 43 and during the other half of a clock signal period this output 43 is connected to the input 39 of the change-over switch 37.

The television signals at the inputs 7, 15 and 17 of the selection circuit 9 correspond to three horizontally successive samples of the same vertical position. If the television signals corresponding to two successive samples of the television signal from the current field applied to the input 1 are present at the inputs 7 and 17, the television signal corresponding to the sample from the previous picture which is horizontally located therebetween is present at the input 15.

The change-over switch 37 now alternately applies a television signal to its output 43 corresponding to a sample having a given horizontal position and to a sample selected from three samples successively having the said horizontal position, a horizontal position located between this position and the horizontal position of the subsequent sample from the current field and the horizontal position of the next sample from the current field. The sample at the input 15 of the selection circuit 9 is horizontally located between the samples at the inputs 7 and 17 because the television signal at the input 1 of the circuit arrangement is sampled in anti-phase from picture to picture.

The operation and some possible embodiments of the decision circuit 27 are described in European patent application No. 192292. For their description reference is made to this Application.

Figure 2:
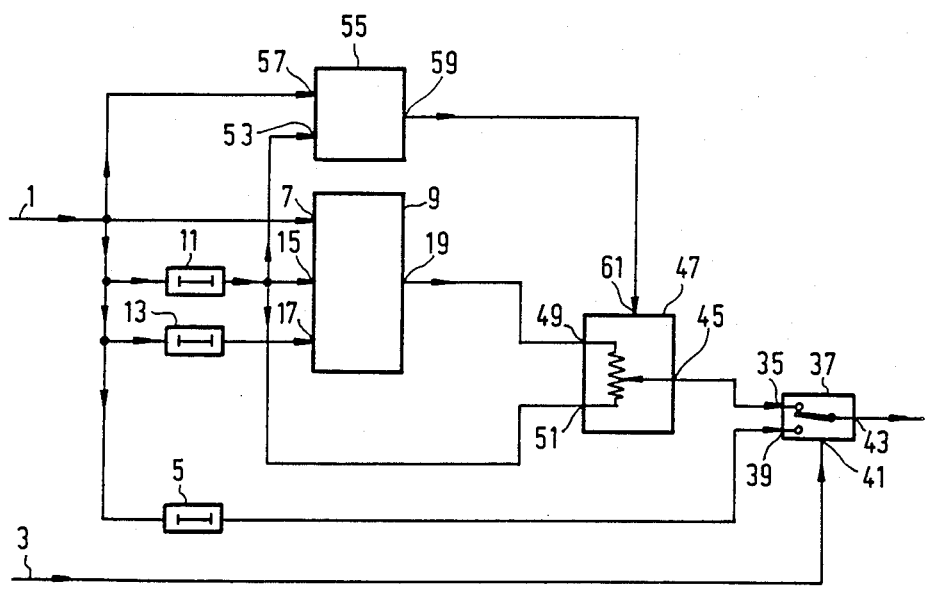

The same reference numerals as in FIG. 1 have been used for corresponding components in FIG. 2. For their description reference is made to this Figure.

In this case the input 35 of the change-over switch 37 is connected to an output 45 of a motion-dependent interpolation circuit 47 an input 49 of which is connected to the output 19 of the selection circuit 9 and an input 51 of which is connected to the output of the picture delay circuit 11 which is further connected to an input 53 of a motion detector 55. The motion detector 55 has a further input 57 which is connected to the input 1 of the circuit arrangement and an output 59 which is connected to a control signal input 61 of the motion-dependent interpolation circuit 47.

If there is a strong motion in the picture, the output 45 of the interpolation circuit 47 is connected to the output 19 of the selection circuit 9 and if there is no motion it is connected to the output of the picture delay circuit 11. In the case of a moderate motion the interpolation circuit 47 selects a suitable amplitude ratio of its input signals.

In the embodiments shown the selection circuit 9 is used for selecting from two signal samples from the current field and the interpositioned signal sample from the previous picture. If desired, it is alternatively possible to cause the selection circuit to select from two signal samples from the previous picture and the interpositioned signal sample from the current field.

In the case of given signal patterns in which frequencies occur which amount to two-thirds of the sampling frequency for which the selection circuit 9 is inoperative, it is found that the operation of the selection circuit can be improved by means of linear or non-linear filters in manners corresponding to those described for the line number doubling circuits of the above-mentioned European patent application No. 192292.

What is claimed is:

1. A circuit arrangement for enhancing the horizontal definition of an interlaced television signal comprising a plurality of pictures, said circuit arrangement having a circuit input coupled to a television signal source for applying thereto a first plurality of horizontal samples having a vertical position, sampled from a first picture of said television signal, and a second plurality of horizontal samples having said vertical position, sampled from a successive picture in anti-phase with respect to said first picture, wherein said circuit arrangement comprises:
    a selection circuit having three inputs and an output;
    means coupled to said circuit input for applying to each of said three selection circuit inputs respectively, three horizontally successive samples comprising alternate ones of said first and second horizontal samples having the same vertical position; and
    means for providing at said output the one of said horizontal samples applied at said selection circuit inputs at any instant which has an amplitude at that instant which is closest in value to the mean value of the amplitudes of said applied horizontal samples.

2. The circuit arrangement of claim 1 further comprising:
    a first delay means having an input coupled to said circuit input and an output;
    a second delay means disposed between said circuit input and said selection circuit; and
    a third delay means disposed between said circuit input and said selection means.

3. A circuit arrangement as claimed in claim 2, characterized in that it further comprises a change-over switch which can be operated by a signal of the sampling frequency, one input of said change-over switch being coupled to said output of said first delay means, a second input of said change-over switch being coupled to an output of a motion dependent interpolation circuit, said motion dependent interpolation circuit having a first input which is coupled to said output of the selection circuit and a second input which is coupled to said second delay means.

4. The circuit arrangement of claim 2 wherein said first delay means has a delay of one-half a period of a sampling frequency, said second delay means has a delay of one picture period plus one-half a period of said sampling frequency; and said third delay means has a delay of one period of said sampling frequency.

5. The circuit arrangement of claim 2 further comprising a change-over switch which is controlled by a signal having said sampling frequency and having a first input coupled to said output of said first delay means and a second input coupled to said selection circuit.

6. The circuit arrangement of claim 4 further comprising a change-over switch which is controlled by a signal having said sampling frequency and having a first input coupled to said output of said first delay means and a second input coupled to said selection circuit.

7. A circuit arrangement as claimed in claim 4, characterized in that it further comprises a change-over switch which can be operated by a signal of the sampling frequency, one input of said change-over switch being coupled to said output of said first delay means, a second input of said change-over switch being coupled to an output of a motion dependent interpolation circuit, said motion dependent interpolation circuit having a first input of which is coupled to said output of the selection circuit and a second input of which is coupled to one of said delay means.

* * * * *